Dec. 26, 1944.  L. D. NADEL  2,365,899
REFLEX CAMERA SYNCHRONIZATION
Filed April 16, 1943   7 Sheets-Sheet 2

INVENTOR.
Louis D. Nadel
BY
ATTORNEYS

Dec. 26, 1944.  L. D. NADEL  2,365,899
REFLEX CAMERA SYNCHRONIZATION
Filed April 16, 1943   7 Sheets-Sheet 3
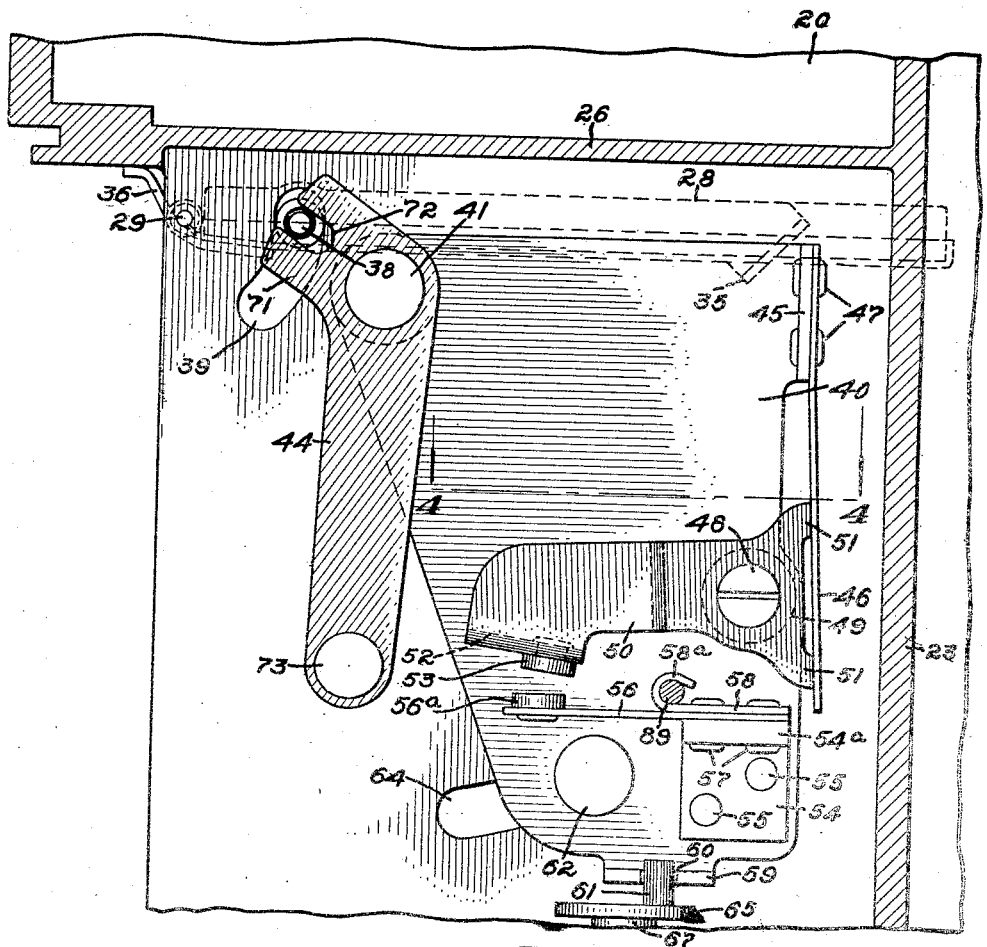
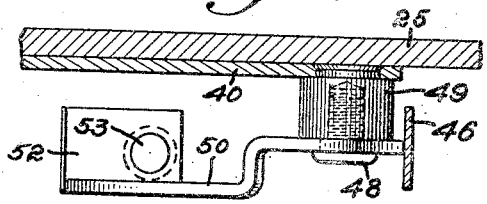
INVENTOR.
Louis D. Nadel
BY
ATTORNEYS Dec. 26, 1944. L. D. NADEL 2,365,899
REFLEX CAMERA SYNCHRONIZATION
Filed April 16, 1943 7 Sheets-Sheet 4

INVENTOR.
Louis D. Nadel
BY
ATTORNEYS

Dec. 26, 1944.   L. D. NADEL   2,365,899
REFLEX CAMERA SYNCHRONIZATION
Filed April 16, 1943   7 Sheets-Sheet 5

INVENTOR.
Louis D. Nadel
BY
ATTORNEYS

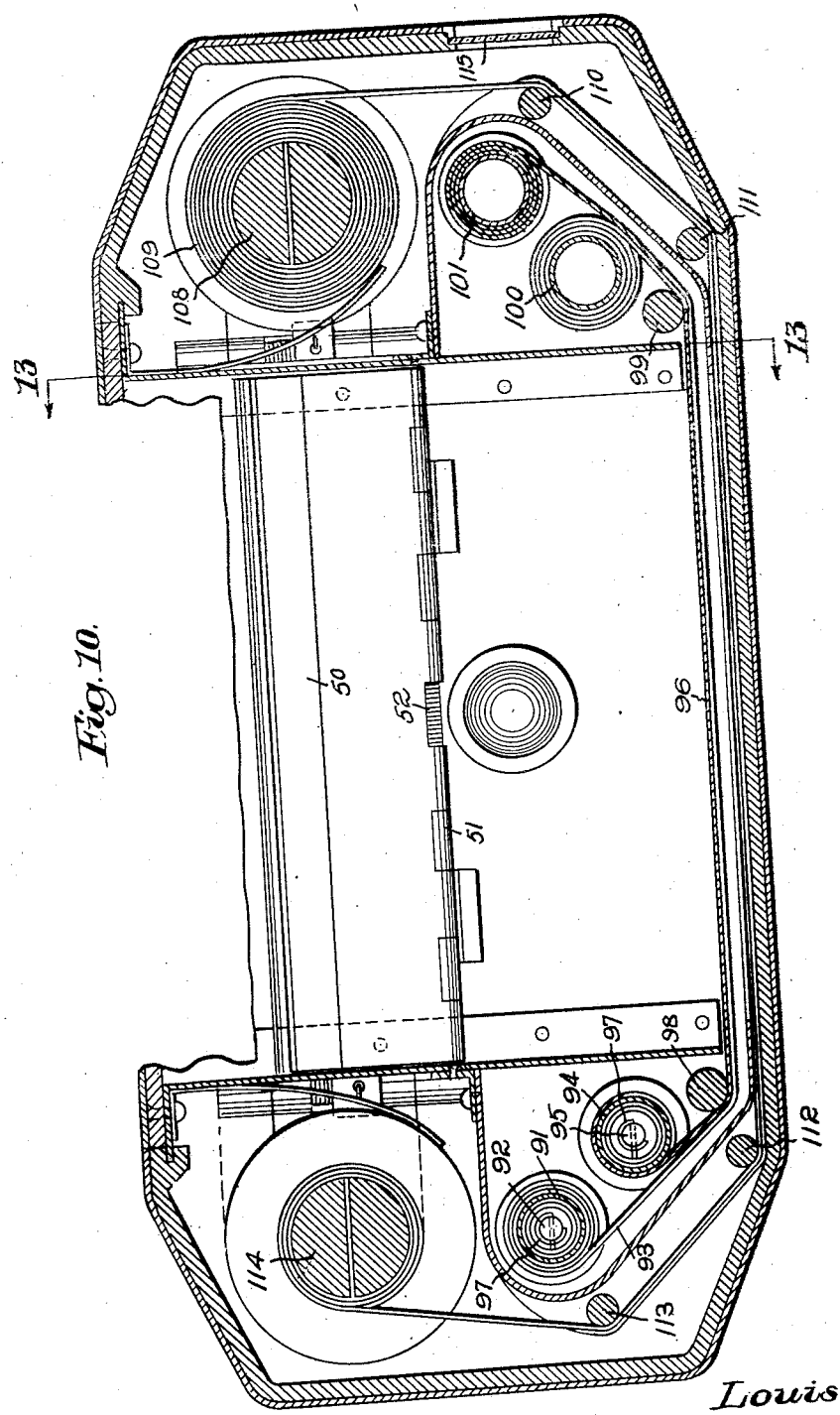

Dec. 26, 1944.                L. D. NADEL                2,365,899
                    REFLEX CAMERA SYNCHRONIZATION
                Filed April 16, 1943            7 Sheets-Sheet 7
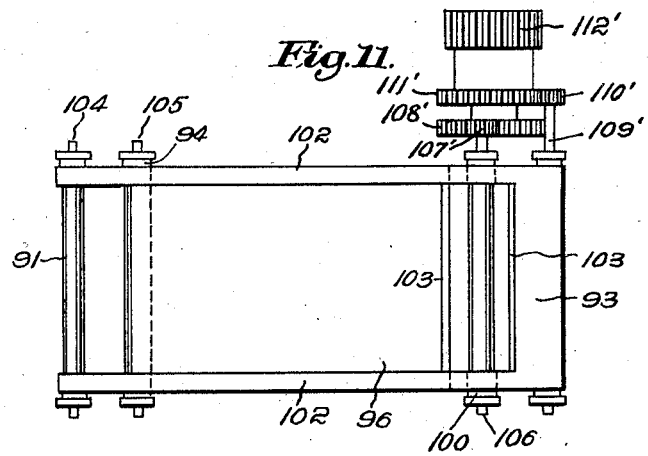
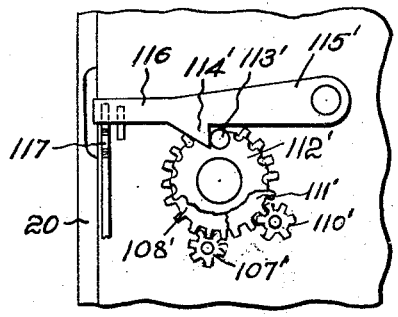
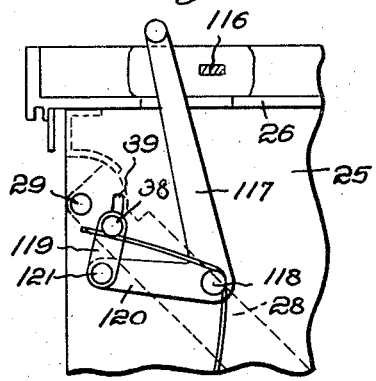
INVENTOR.
Louis D. Nadel, Patented Dec. 26, 1944

2,365,899

UNITED STATES PATENT OFFICE 2,365,899

REFLEX CAMERA SYNCHRONIZATION

Louis D. Nadel, Rochester, N. Y., assignor to The Folmer Graflex Corporation, Rochester, N. Y., a corporation of Delaware Substituted for abandoned application Serial No. 336,073, May 20, 1940. This application April 16, 1943, Serial No. 483,267

18 Claims. (Cl. 67—29)

This application is a continuing application disclosing all of the subject-matter of my co-pending original application Ser. No. 336,073, filed May 20, 1940, now abandoned, entitled "Reflex camera synchronization", this application being a complete duplicate of the said original application, and therefore constituting a substitute application therefor.

This invention relates to new and improved means for synchronizing photoflash bulbs with reflecting cameras having movable mirrors.

Important objects of my invention are: to provide synchronizing means that will accurately synchronize the opening of the focal-plane shutter with the flashing of the photoflash lamp; to provide means for adjusting the time of the closing of contacts with respect to the mirror travel, thereby controlling the time of flash with respect to the mirror travel; to provide synchronizing means that cannot inadvertently flash a bulb, as in resetting the mirror; to provide synchronizing means wholly within the camera housing and thereby fully protected from all mechanical injury and tampering; and to provide means for synchronizing photoflash lamps with reflecting cameras having focal-plane shutters, the structural parts of such mechanism being of very rugged character and requiring a minimum of adjustment in manufacture. Other objects of the invention will be evident from the following description of one embodiment of the invention.

In order that the principle of the invention may be readily understood, I have disclosed a single embodiment thereof in the accompanying drawings, wherein—

Fig. 3 is a vertical sectional view similar to Fig. 1, the mirror having traveled all the way to the top and the synchronizing contacts having been opened;

Fig. 4 is a detail in section on the line 4—4 of Fig. 3;

Fig. 5 is a vertical sectional view similar to Fig. 1, the mirror traveling in a downward direction to the reset position, the contacts being shown as held open;

Fig. 6 is a vertical section on the line 6—6 of Fig. 5;

Fig. 10 is a horizontal longitudinal section taken through the entire camera but on an irregular line so as to show the parts more plainly, but omitting the lens mounting structure, and corresponds to Fig. 14 of the Petit and Hineline Patent 1,980,546;

Fig. 11 is a schematic view from the rear of the camera, showing the curtains, curtain rollers and shutter rewind mechanism;

Fig. 12 is a fragmentary top plan view of the shutter rewinding mechanism showing the shutter release lever and the mirror setting lever, which also trips the shutter; and Fig. 13 is a fragmentary section taken through Fig. 10 on the line 13—13 thereof, showing the connections from the mirror setting lever, and corresponds to Fig. 16 of said Petit and Hineline Patent 1,980,546.

My invention is particularly applicable to reflecting cameras having movable mirrors and particularly to cameras of the single-lens reflecting type, wherein the reflecting mirror causes the focal-plane shutter to be actuated, and is more particularly applicable to so-called miniature cameras, as hereinafter set forth. One example of a miniature camera of such type is disclosed in the patent to Petit and Hineline, No. 1,980,546, dated November 13, 1934.

My invention, as will be evident from the following detailed description, is a distinct advance in the art and is an improvement upon the generic invention disclosed in the patent to Torkel Korling, No. 2,029,238, January 28, 1936, and is peculiarly applicable to so-called miniature cameras, namely, those taking pictures smaller than 2¼ x 3¼. Said Korling patent does not disclose a miniature camera.

I have elected to show my invention as applied to a reflex camera of the Graflex type such as is disclosed in the said patent to Petit and Hineline, No. 1,980,546, which discloses only a miniature camera, and which discloses a roll-film type of camera. The mechanism herein disclosed is peculiarly applicable to a reflex camera of the miniature type for reasons herein subsequently set forth, and the disclosed mechanism is also peculiarly applicable to a roll-film type of camera. Inasmuch as the operation of the shutter by the mirror movement is well known to those familiar with the art, it is unnecessary to describe such part of the mechanism herein otherwise than to state that in usual practice the focal-plane shutter curtains are wound upon rollers against spring tension and the shutter is caused to operate by releasing consecutively the take-up rollers, as shown in said Korling patent.

Figure 1:
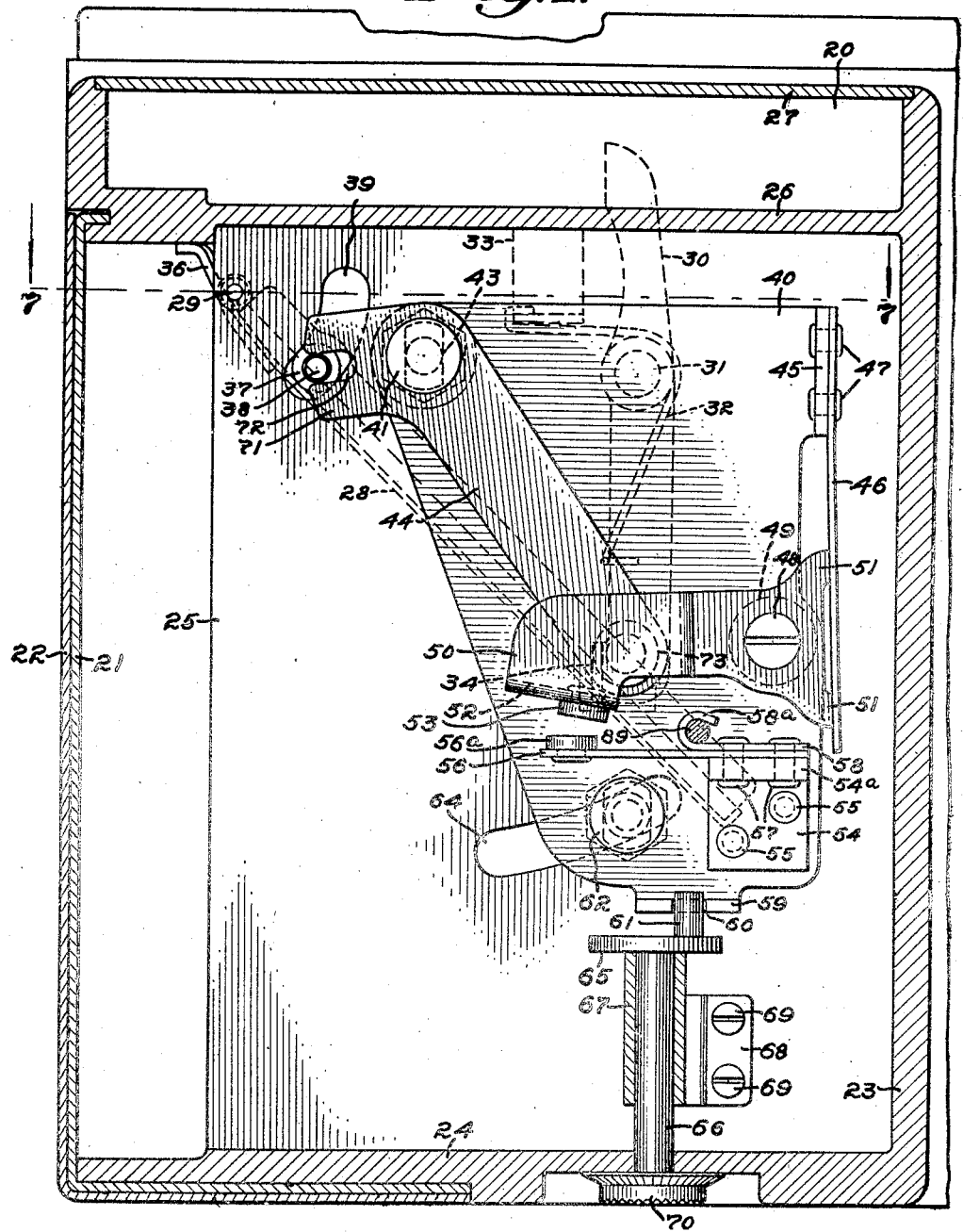
Fig. 1 is a vertical section through a camera showing one of the camera walls (i. e., a transversely extending inner wall) having the invention attached thereto, the parts being in the position they occupy when the camera is set in readiness for making an exposure.

It will be evident from Fig. 1, and other figures of the drawings showing a vertical section through the camera, that the reflecting mirror is caused to travel upward under spring influence, and just before the mirror reaches the end of its travel, it contacts with some part, such as a pin, or a system of levers and pins, which in turn release the first curtain roller of the two-curtain focal-plane shutter preferably used in coordination with the mirror-operating mechanism and synchronizing mechanism herein shown.

In all cameras of such general structure, so far as I am aware, the aperture in the curtain is located very near the exposure area, and if a contact were caused to be made by means controlled by the curtain mechanism, the curtain would be well on its way across the exposure area before the photoflash bulb would be ignited, since there is a certain definite delay or time interval or time lag between the time when a circuit is made through the photo-flash lamp and the time when the lamp is actually ignited and a resulting illumination is built up to a useable point.

Figure 9:
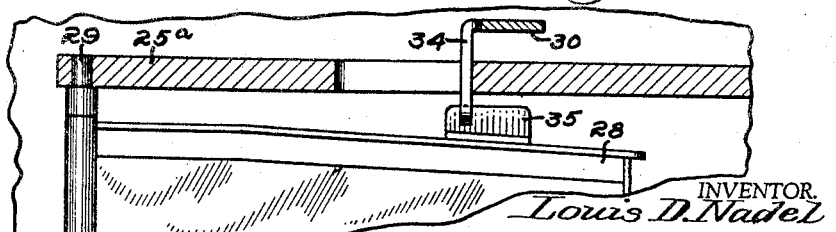
Fig. 9 is a fragmentary vertical section through a camera wall showing the relation between the mirror and mirror-release arm.

The Korling Patent No. 2,029,238 discloses in Figs. 9 and 10 a focal plane shutter operated by upward movement of the mirror frame. I may use the means there shown or other suitable means for operating a focal-plane shutter by upward mirror movement. In said Korling patent, the focal-plane shutter may be held open while the mirror is down, the mirror acting as a shutter and the focal-plane shutter curtain being at a suitable point automatically tripped and closed by upward mirror movement, or the focal-plane shutter may be set for exposure of desired duration, the movement of the mirror releasing the curtain mechanism after the mirror has moved from the path of incoming rays from the lens.

I may use the Korling patent mechanism or other suitable means to operate the focal-plane shutter by mirror movement, so as both to open and to close the focal-plane shutter, or merely to close such shutter. Preferably I use a two-curtain or two-part focal-plane shutter, initiating the movement thereof by upward mirror movement.

My invention constitutes an improvement upon the mechanism disclosed in said Korling patent, in that I have greatly simplified the entire synchronizing mechanism, positioning it wholly within the camera casing, and so organizing it that no attention need be given by the camera user to the operation of the synchronizing mechanism, which not only is entirely concealed within and protected by the camera casing, but is very readily adjustable to vary the exact timing of the flash with respect to the beginning of the upward mirror movement, thus very accurately synchronizing the opening of the focal plane shutter (whether of the one-curtain or two-curtain type) with the flashing of the photoflash lamp. To accomplish this result, I cause the contacts to be closed at such time that the flash will begin before the shutter operation or opening begins, and I provide for varying the time interval between commencement of mirror upward movement and the contact closing. As hereinafter set forth in detail, the disclosed construction is such that the synchronizer can be adjusted so that contact takes place when the mirror has traveled only ten degrees in an upward direction, and it can also be adjusted so that contact takes place as late as ten degrees before the mirror reaches the limit of its upward travel to picture-taking position. The disclosed construction permits an adjustment over a range of twenty-five degrees. In any condition of adjustment the contacts are again opened not later than the time the mirror reaches horizontal or picture-taking position.

In accordance with my invention I make use of the delay or time interval or time lag in the movement of the mirror in its travel after it has been released and before it releases the shutter. This short time lag is much greater than any time lag necessary for the proper operation of the flashlamp in synchronization with the shutter. However, any suitable portion of such time lag can be used, and in the selected embodiment of my invention, I have shown mechanism for properly synchronizing a photoflash lamp with a focal-plane shutter in cameras of the reflex type.

The camera case is indicated generally at 20. It is provided with a back 21 covered with leather or other suitable material 22, a front wall 23, a bottom wall 24 and an end or side wall 25 having the exposure opening. The opposite end or side wall 25a is shown only in Fig. 9. The upper wall of the camera is shown at 26 and the mechanism cover plate at 27. To the said end or side wall 25 is pivoted a mirror frame 28 by a pin 29, said frame carrying a suitable mirror, as indicated at 28a in dotted lines in Fig. 1 and in solid lines in Fig. 7. It is important that there be provided the greatest possible mirror area, and therefore the stationary pin 29 is placed as near the upper wall 26 of the camera as possible. To the said opposite side or end wall 25a is pivoted a mirror release lever 30, shown in Fig. 9 and also in dotted lines in Figs. 1, 2 and 5. The said mirror release lever 30 is held to the said camera side or end wall 25a by a shoulder rivet 31, shown in dotted lines in Figs. 1, 2 and 5.

The general shape of the camera casing in longitudinally extending transverse or horizontal section is similar to what is shown in Fig. 14 of the said patent to Petit and Hineline, No. 1,980,546, the wall 25, against and onto which the hereinafter described synchronizer mechanism plate is pivotally mounted in a face-to-face relation, being or corresponding to the transversely extending inner wall shown near the left hand end in said Fig. 14 of such Petit and Hineline Patent No. 1,980,546.

The synchronizer mechanism herein provided is contained wholly within the camera housing or casing, and inasmuch as synchronizing means cannot effectively be placed directly upon the pin 29, I have, as stated, attached the synchronizer means to an inner, transversely extending wall of the camera which, in the disclosed construction, is the wall 25, and I produce the peak of the flash coincidentally with the presentation of an exposure area of the shutter, after its said release, at the exposure aperture of the camera. It will be observed that the contacts 53 and 56a are located at a substantial distance from the pivotal point of the mirror, and yet at the same time there is provided a long movement of the depending arm of the lever 44 to close the contacts. By reason of the disclosed construction, a very much shorter angular movement of the mirror is required to cause the closing of the contacts by movement of the member or lever 50, followed by the immediate reopening of the contacts after the said long arm of the lever 44 has passed off extension 52. It will be seen that I have provided, for inter-engagement with and movement by the mirror frame as it moves upward angular motion multiplying means that engages with the movable member carrying one of the contacts, which angular motion-multiplying means, in the disclosed embodiment of the invention, is the synchronizer lever 44.

Figure 2:
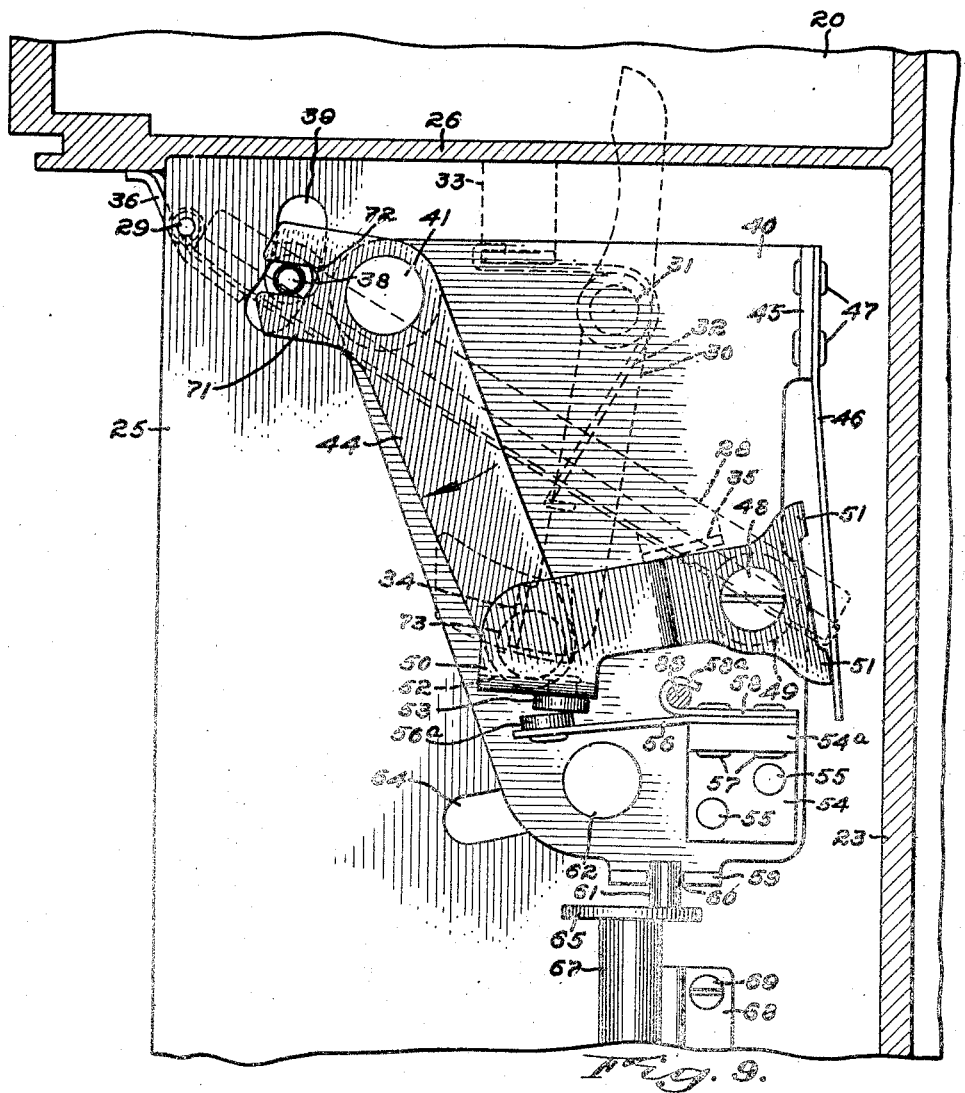
Fig. 2 is a vertical sectional view similar to Fig. 1, the exposure button having been released and the mirror traveling in an upward direction, causing the contacts of the synchronizer to be closed.

The said mirror-release lever 30 is caused to turn in a contraclockwise direction by means of a spring 32, shown in dotted lines in Figs. 1, 2 and 5. The upper end of the said spring 32 is hooked around an angle plate 33, shown in dotted lines in Figs. 1, 2 and 5. The said mirror release lever 30 has a right-angled bend in its lower end forming a projection 34, shown in dotted lines in Fig. 2, and which passes through an opening in the camera wall 25a and engages a latch plate 35, shown in dotted lines in Fig. 2 and in full lines in Fig. 9, as attached to the mirror frame 28.

When the said mirror frame 28 is in the position shown in Fig. 1, it is held therein by means of the latch plate 35 riding on the projection 34 of the mirror-release lever 30. When said lever 30 is caused to move in a clockwise direction, the said projection 34 will leave the latch plate 35 (Fig. 9), thus allowing the mirror frame 28 to swing in an upward direction, as indicated in Fig. 2, from the position indicated in Fig. 1 about its pivot 29 under the influence of a spring 36. The said mirror frame 28 is usually returned to the position shown in Fig. 1 by automatic means when the shutter is operated, but as such means is well known in the art, it needs no further disclosure or description here. However, in some instances, as in the case of the camera shown in the Petit and Hineline Patent No. 1,980,546, the mirror frame 28 or the equivalent thereof is reset manually. The herein disclosed synchronizing mechanism may be attached to such type of camera shown in said patent equally well, and also to other types of cameras having movable mirror frames.

To the said mirror frame 28 is attached a stud 37 having a reduced end portion 38, and the said stud 37 travels with the mirror frame 28, a curved slot 39 being provided in the camera wall 25 to clear the said stud 37. To the camera wall 25 is attached a synchronizing mechanism plate 40, pivoted on a shoulder screw 41 held to the said camera wall 25 by means of a nut 42, clearly shown in Fig. 7. The said shoulder screw 41 is provided with flats 43 received at or engaging a suitably shaped hole in the camera wall 25, thus preventing the screw 41 from turning when the nut 42 is tightened. Such flat construction also provides a shoulder so that the shoulder screw 41 may be tightened against the camera wall 25 by the nut 42, and yet allow sufficient looseness so that the mechanism plate 40 may be moved about the pivotally acting shoulder screw 41 which is of sufficient length to receive a washer 41a and also to receive a synchronizing lever 44, both of which are carried by the said shoulder screw 41 and are free to turn thereon, as most clearly shown in Fig. 7.

The synchronizing mechanism plate 40 is provided with an upturned lip 45 to which is secured a flat or plate spring 46 by means of rivets 47, 47 or in any other suitable manner. Also attached to the said synchronizing mechanism plate 40 by means of a shoulder screw 48 threaded into a boss 49 riveted to the said mechanism plate 40, is a rocker member or lever 50. Said member or lever 50 is provided with two feet or projections 51, 51 that engage spring 46, and thus tend to hold the said rocker member or lever 50 in the position shown in Fig. 1. Nevertheless the said rocker member or lever 50 may be turned about the shoulder screw 48 against the tension of the spring 46, but, when released, the said rocker member or lever 50 will always return to the position shown in Fig. 1. One end of the said rocker member or lever 50 has an L-shaped extension 52 to which is riveted or otherwise secured a contact or terminal 53. The said extension 52 has an additional function to be referred to hereinafter. Herein, because of the position in which the camera is held when the picture is being taken, the wall 23 of the casing is defined as the front wall, the wall 22 as the rear wall and the rocker member or lever 50 is defined as occupying a horizontal position when the contacts are separated, as in Figs. 1 and 3.

Secured to the synchronizing mechanism plate 40 is an insulating block 54 provided with an L-shaped or angle portion 54a. The said insulating block 54 is connected to the said mechanism plate 40 by means of rivets 55, 55, and to the said angle portion 54a of the insulating block 54 is riveted a contact spring 56 having a contact or terminal 56a. Overlying the contact spring 56 and secured thereto by rivets 57, 57 is a connector strip 58. The said rivets 57, 57 serve to connect both the contact spring 56 and the connector strip 58 to the insulating block 54.

Figure 7:
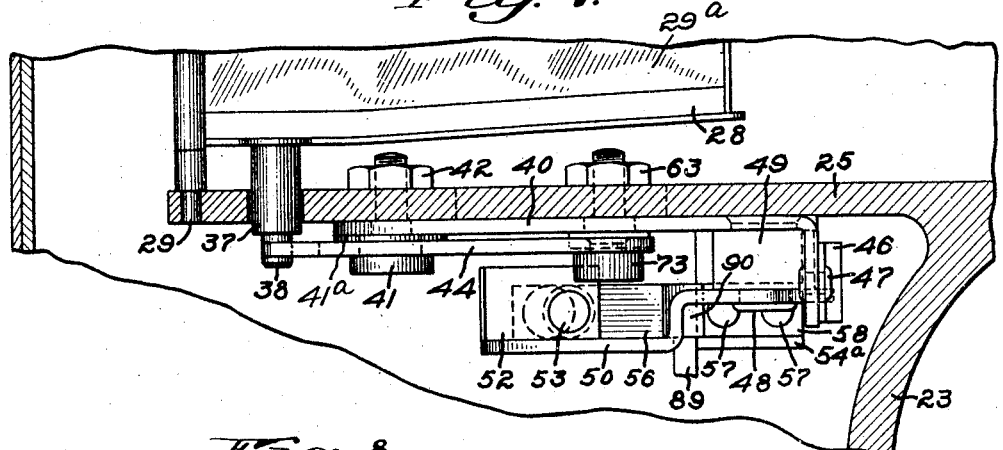
Fig. 7 is a fragmentary plan view partly in section, showing the relation of the synchronizer parts with respect to the mirror frame.

The lower end of the said synchronizer mechanism plate 40 is provided with an out-turned end or flange 59 having a slot 60 in which is received a pin 61. The lower end of said mechanism plate 40 is provided with a shoulder screw 62 extending through the camera wall 25 and provided with a nut 63 on the inner side of the camera wall 25, as shown in Fig. 7. The said nut 63 tightens against the shoulder of the screw 62 with just sufficient pressure to allow the mechanism plate 40 to be moved about the shoulder screw 41 as a pivot, under the influence of pin 61. An arcuate slot 64 is provided, so as to allow the shoulder screw 62 to travel in an arc sufficient to provide the necessary adjustment of the synchronizer mechanism plate 40.

The said mechanism plate 40 is caused to be moved in a clockwise or contraclockwise direction about the shoulder screw 41 by any suitable means. In the disclosed embodiment of the invention, the means provided for the purpose consists of the pin 61 engaging as described the slot 60 of the upturned flange 59. The said pin 61 is attached to a disk 65 carried on a shaft 66 in a bearing sleeve 67 constituting part of the bearing bracket 68 held to the camera wall 25 by means of screws 69, 69. The said shaft 66 passes through the bottom camera wall 24 and has at its outer end a dial 70 attached at the outside of said bottom wall 24, so as to be accessible for manual operation by the user of the camera. The said dial 70 is provided with graduations (not shown) so that the synchronizer mechanism plate 40 may be adjusted to any position within the lengthwise limits of the slot 64 by means of the dial 70, and so as to have its position indicated on the outside of the camera by the said graduations. This makes it possible for the operator readily to adjust the synchronizer herein disclosed for use with the type of photoflash bulbs herein disclosed or referred to. The synchronizer lever 44 is provided with a bifurcated end 71 adjacent the shoulder screw 41, providing a slot 72 in which rides the stud 37. On the opposite end of the synchronizer lever 44 is provided a stud 73, most clearly shown in Fig. 3.

Fig. 1 shows the mirror frame 28 in position for focusing just prior to the making of an exposure. When the operator is ready to make an exposure, the usual camera release button is pressed, thereby causing the release of mirror-release lever 30, which is accordingly then turned in a clockwise direction by means not herein shown but well known in the art, thus withdrawing the bent-over end 34 (Fig. 2) from the mirror-latch plate 35 (Fig. 9), allowing the mirror 29a and mirror frame 28 to swing upward on the pivot 29 under the influence of the spring 36. Inasmuch as the stud 37 is attached to the mirror frame 28, the synchronizer lever 44 will be caused to rotate in a clockwise direction because of the engagement of stud 37 with the slot 72. As the synchronizer lever 44 rotates in a clockwise direction, it carries with it the stud 73 (Fig. 2), which overrides the L-shaped extension 52 of the rocker member or lever 50, causing the latter to rotate about the shoulder screw 48 against the action of plate spring 46, closing or bringing together the contacts 53 and 56a, as shown in Fig. 2.

It will be evident from the foregoing disclosure that I have provided a synchronizer lever 44 which, as shown in Fig. 6, is pivoted at 41 laterally beyond the mirror and mirror frame, but at a point in front of the inclined plane of the mirror when the mirror is in focusing position, and near a horizontal plane passing transversely through the pivotal axis of such mirror, the said synchronizer lever having a short arm extending from its pivot 41 into interengaging relation with the frame of the mirror and having downwardly extending from its pivot a long arm having a ratio of substantially three to one with the short arm, such long arm being positioned in front of the said inclined plane of the mirror when the latter is in focusing position, the said long arm of the lever 44 having a stud or formation 73 to engage the contact-carrying movable member or lever 50 by a swinging movement of the said long arm, which swinging movement is opposite to the direction of upward swing of the said mirror and simultaneous therewith. The said long lever arm provides, because of the interengagement of the short arm with the mirror frame, a substantially greater speed of movement, where it engages and moves the said contact-carrying movable member or lever 50, than the upward speed of the simultaneously moving mirror toward its picture-taking position upon release. Therefore, the contacts 53 and 56a are closed at such an early part of the mirror movement time as to cause the flashing of the lamp to begin before the shutter begins to open.

As the mirror frame 28 continues to move in an upward direction, the synchronizer lever 44 will continue to rotate in a clockwise direction until the stud 73 leaves the L-shaped end 52 of the said rocker member or lever 50, thus allowing the spring 46 to return said member or lever 50 to the position shown in Fig. 3, wherein the mirror frame 28 is shown in dotted lines as having traveled all the way up and the synchronizer lever 44 as having rotated all the way in a clockwise direction, causing the contacts to open. During the time that the contacts 53 and 56a are closed, a circuit was made between said contacts and the battery and flashlamp, the circuit of which will be later more fully referred to.

Just before the mirror frame 28 reached the position shown in Fig. 3, the shutter of the camera was caused to be released. Therefore, it will be evident that there occurred a considerable time interval between the time of closing the contacts 53 and 56a and the time when the shutter was released. The total length of time occurring between the closing of the contacts 53 and 56a and the time the camera shutter is released is controlled by a number of variables, such as the friction occurring at the bearing on pin 29, the strength of the spring 36 and the amount of air resistance to the movement of the mirror frame 28. However, since the synchronizer mechanism plate 40 is made adjustable as herein disclosed, I am therefore by my invention enabled readily to compensate for any such variables, so that the time lag between the instant of closing the contacts 53 and 56a and the instant that the mirror frame 28 releases the shutter, can be so adjusted that such time lag is equal to the time lag of the flash-bulb or slightly less, so that the flash-bulb will have been ignited prior to curtain opening.

As the mirror frame 28 is returned to the focusing position, the synchronizer lever 44 will be caused to be turned in a contraclockwise direction under the influence of the stud 37 in slot 72, and the stud 73 will ride on the underneath side of the L-shaped extension 52 of the rocker member or lever 50, causing said member or lever to be rocked in a clockwise direction against the spring 46 and about the shoulder screw 48, as most clearly shown in Figs. 5 and 6. When the mirror frame 28 reaches the all-the-way-down position shown in Fig. 1, the stud 73 will have passed beyond the face of the L-shaped extension 52 of the rocker member or lever 50, allowing the said member or lever 50 to be returned to the position shown in Fig. 1, ready for a second exposure.

It will be seen that by the disclosed construction I have provided means whereby the contacts such as 53 and 56a are closed only as the mirror 29a and mirror frame 28 are traveling in an upward direction, viewing Figs. 1, 2 and 3. The said contacts are not closed when the mirror 29a and mirror frame 28 travel in a downward or resetting direction. This is very important, because if such precaution were not taken or provided for, a flash-bulb might inadvertently be flashed, thus causing its loss. The time when contacts 53 and 56a are closed with respect to the position of the mirror frame 28 in its upward travel, is determined by the position of the said synchronizer mechanism plate 40. If said plate 40 were caused to be adjustingly moved in a contraclockwise direction about the shoulder screw 41, contact or circuit closing would take place earlier because the contacts 53 and 56a would be closed at an earlier time. If said synchronizer mechanism plate 40 were adjusted about the shoulder screw 41 in a clockwise direction, the contacts 53 and 56a would close at a later time, because the synchronizer lever 44 has to travel a greater distance after the mirror is released before the rocker arm or lever 50 is caused to be thrust downward, closing contacts 53 and 56a.

The position of the said synchronizer mechanism plate 40 is adjusted by means of the disk 70 and sufficient capacity for adjustment has been provided to allow for sufficient lag for any flash bulb now known to me. Within the scope of the invention, I may provide for greater adjustment, as will be readily understood.

It will be observed, comparing Fig. 1, showing the mirror in focusing position, Fig. 2, showing the mirror elevated substantially fifteen degrees of the forty-five degrees of movement to horizontal or picture-taking position and showing the contacts 53 and 56a as touching, and Fig. 3, showing the mirror in horizontal or picture-taking position and the contacts separated, that the mirror in moving from its focusing position in Fig. 1 to its picture-taking position in Fig. 3 travels forty-five degrees, and with the adjustment of the synchronizer mechanism plate 40, shown in the several figures, the contacts 53 and 56a meet when the mirror has traveled upward fifteen degrees (i. e., one-third of its upward movement). The adjusting means represented in the drawings, and in accordance with which the synchronizer mechanism plate 40 may be swung, so that the shoulder screw 62, carried by the mechanism plate 40, may be at either end of the arcuate slot 64, is such that the synchronizer can be adjusted so that contact takes place when the mirror has traveled only ten degrees in an upward direction, and it can also be adjusted so that the contact takes place ten degrees before the mirror reaches the limit of its upward travel to picture taking position. In other words, inasmuch as the mirror travels forty-five degrees, the construction shown permits an adjustment over a range of twenty-five degrees (being twelve and a half degrees either way from what may be termed the central position of adjustment), such range of adjustment occurring in the intermediate part of the total travel of the mirror and not any of it occurring at the extreme upper limit of such travel, since, in accordance with my invention, the contacts are again opened not later than the time the mirror reaches horizontal or picture-taking position. Thus there is provided by my invention adjusting means to vary by advancement or by retardation the time of closing the contacts from said half-way point, to effect synchronization with the peak of the flash of the photo-flash lamp, but without thereby preventing the subsequent opening of the said contacts by the time the mirror reaches its picture-taking position, and not affecting such opening of such contacts except for such advancement or such retardation thereof as is incidental to the said adjustment of the exact instant of the said closing of the said contacts, but assuring such opening of such contacts by the time the mirror reaches its picture-taking position.

Figure 8:
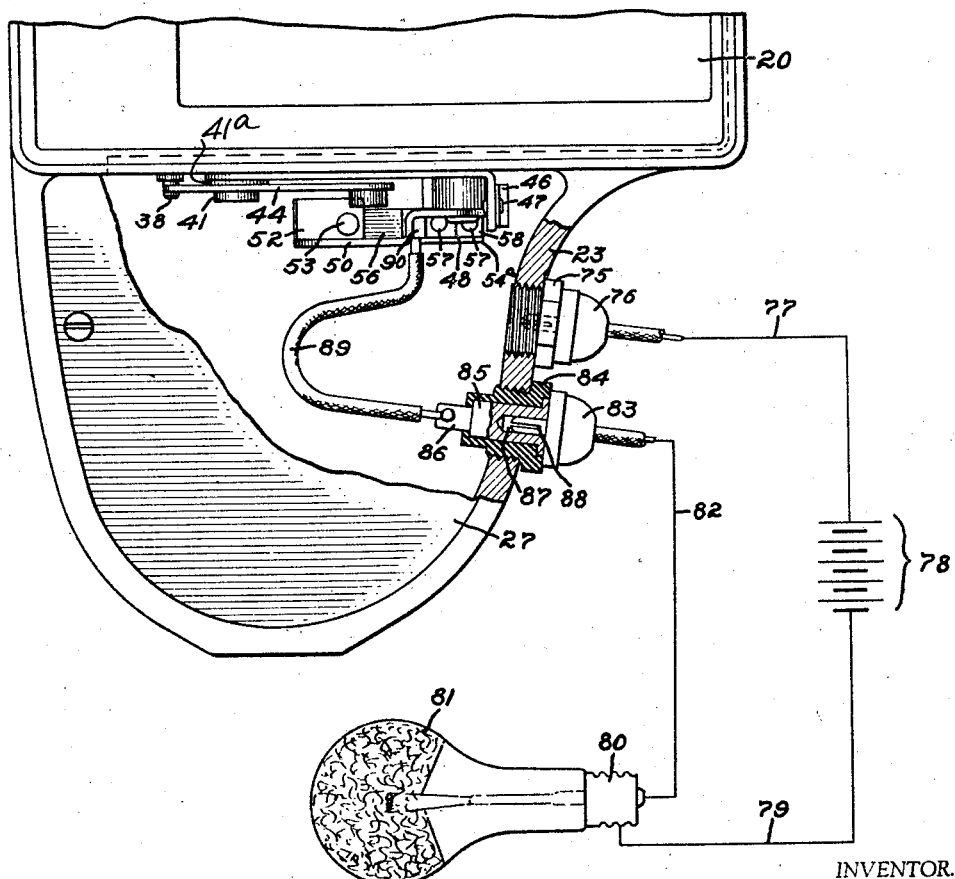
Fig. 8 is a detail in plan view with parts of the camera cut away to show the electrical contacts between the synchronizer, the battery and the photoflash lamp.

In Fig. 8 is shown attached to the front camera wall 23 a contact member or connector 75 into which is connected a detachable plug 76, itself connected to a battery 78. Leading from the said battery is a wire 79 itself connected to one side of a flash-bulb base 80 of a flash-bulb 81. A wire 82 is connected to the control contact of the flash-bulb 81, and to an insulating plug 83, which is received in an insulated receptacle having an insulating bushing 84 threaded into the camera front wall 23. In the threaded bushing 84 is placed a sleeve 85 having a projecting member 86 and a hole 87 for connecting a prong 88 of the plug 83. Attached to the said projecting member 86 is a wire 89 attached to connector strip 58 by means of a loop 90. The circuit is then completed through the contact 56a, contact 53, arm 50, shoulder screw 48, stud 49, camera wall 25, front camera wall 23, and contact member or connector 75.

The contacts 53 and 56a are open when the parts are in the position shown in Fig. 3, thus interrupting the electrical circuit. If a new flash bulb is inserted, it cannot be ignited until the mirror frame 28 has been reset and again released for a second picture.

So far as I am aware, I am the first to provide a synchronizer in which the photoflash lamp can be ignited only during a picture-taking movement of the mechanism, it being, of course, impossible, in the herein disclosed construction, to flash the lamp inadvertently by inserting a new bulb in the lamp socket after the picture is made, or during the operation of preparing the camera for the next exposure which includes resetting the mirror.

I am also the first so far as I am aware to complete the circuit during a predetermined part of the movement of the mirror to picture-taking position and for opening said circuit thereafter, but prior to mirror movement back to resetting position.

In the construction herein disclosed, I have provided means for completing the circuit during movement of the mirror to picture-taking position, and for preventing flashing of an inserted photoflash bulb during return movement of the mirror to resetting position.

It will be observed that the circuit is open when the parts are in the position shown in Figs. 1, 3 and 5, thus preventing flashing at undue times, and that it is closed when they are in the position shown in Fig. 2.

The synchronizer herein disclosed is the product of a great deal of research and experimentation during the course of which I have ascertained that the invention is wholly practical, accurate and reliable in operation although the construction of the selected embodiment of the invention is one of comparatively few parts. The structure is so rugged that it will continue to operate for many thousands of cycles.

Since all the parts of the invention are within the camera housing, and hence are protected from dust and other disturbing influences, the synchronizer herein disclosed is hidden from view when the camera is closed and is thoroughly protected. Inasmuch as the synchronizer is always connected to the camera mechanism and therefore functions each time that an exposure is made, whether or not a flash-bulb is connected, no thought or attention of the operator is necessary beyond that involved in the simple act of connecting the battery and flash-lamp to the camera, for once the synchronizer has been adjusted, it will remain adjusted indefinitely and will require no further adjustment or attention from the operator.

While I have herein referred to the Korling Patent No. 2,029,238 as disclosing a generic invention, it is to be understood that the type of camera disclosed in said Korling patent is entirely different from the type of camera to which my present invention pertains, for the following reasons.

The type of camera disclosed in the said Korling patent and the Korling camera itself take pictures of 4 x 5" size. In all such cameras it requires about one-tenth of a second for the mirror to travel the full distance after being released, whereas in a reflex camera of the miniature type to which my invention herein disclosed pertains, the total time elapse from the time the mirror is released until it is stopped at picture-taking position is about twenty milliseconds, varying slightly in accordance with the adjustment of the particular camera. For this and other reasons it is impracticable to synchronize the shutter action with a photoflash lamp of the camera such as that shown in the said Korling patent by the use of the mirror thereof, because of the very slow traveling time of the mirror. It is not possible to speed up the mirror action of such a camera because of the jar that is necessarily imparted to the camera when the mirror is stopped at picture-taking position. Moreover, the focal-plane shutter curtain of the camera disclosed in the Korling patent and in other cameras of that size is a comparatively heavy structure and it requires some little time before it gets under way and before the exposure opening of such shutter curtain reaches the exposure area of the camera. This delay is generally sufficient to provide time for synchronizing flashlamps when working with larger shutters, but in cameras of the miniature size or type, as herein disclosed, the parts of the shutter are very much smaller and very much lighter in weight, and the curtain exposure opening is usually positioned relatively closer to the camera exposure area. The consequence therefore is that there is never sufficient time elapse from the instant the shutter is released up to the instant the exposure aperture of the curtain reaches the exposure area of the camera, to provide proper synchronization. In working with shutters of cameras of the miniature size, it is necessary to provide a delay greater than the delay which is provided by the run-down of the shutter curtain.

Assuming that the mirror lever P of Korling travels through forty-five degrees, which is the amount of the mirror movement, there could not possibly be provided, in Korling, an adjustment greater than ten degrees, or at the outside fifteen degrees, of the forty-five degrees of mirror movement. Moreover, this would be all made at the extreme end of the mirror travel in an upward direction. In other words, Korling can at the utmost adjust his contact so as to take place at not exceeding fifteen degrees before the mirror reaches the limit of its travel in an upward direction, or at any point during said fifteen degrees, until the mirror has reached the extreme limit of its motion.

On the contrary, I have, in accordance with my invention as disclosed in the drawings and in the specification, provided an adjustment for making a contact amounting to twelve and a half degrees on either side of a middle position of the mirror, making a total of twenty-five degrees of mirror movement, leaving unaffected the first ten degrees and the last ten degrees of the mirror movement. Korling provides an adjustment which at the utmost is not in excess of fifteen degrees, but which is all at the final end of the mirror movement (that is, at the uppermost end of the movement of the mirror).

One of the purposes of having the electrical contact made during the early part of the upward movement of the mirror frame is to give sufficient time for the said contacts 53, 56a to be separated before the mirror reaches horizontal or picture-taking position, and it would be impossible to accomplish either of these things by the construction shown in the said Korling patent.

In a miniature camera the shutter moves so fast that when once it is released the aperture would be part way across the exposure area before the flash of the flashlamp could occur. It is essential in a camera of the miniature type that electrical contact be made to the flashlamp before the shutter curtain is actually released.

The construction shown by the Korling patent is such that the contacts of Korling are closed not during the first half and more of the upward swinging movement of the mirror, but very near the end of the upward limit of the swinging movement of the mirror even if the contacts shown in Korling be adjusted to the greatest extent possible to favor early closing of the contacts. The Korling construction is such that even with the utmost adjustment of the contact members or switches, the contact must occur near the upward limit of the movement of the mirror. There would not be sufficient movement of the mirror toward horizontal position left to cause a reopening of the contacts.

I discovered that it is impossible in a miniature camera to use the shutter curtain to cause the contact to effect synchronization with the flash bulb because of the speed of action of the shutter curtain.

I therefore used the mirror movement in getting the proper time delay from the time the contact was closed to the flashlamp and the time the shutter curtain was itself actually released by the mirror movement.

Referring to the matter of the prevention of contact bounce by my invention—in developing my invention I carefully took into consideration the question of contact bounce and I provided the construction herein shown consisting of the plate spring 46 and the spaced feet or projections 51, 51 above and below the pivot 48 of the rocker member 50, which actual innumerable tests thereof show absolutely that contact bounce is precluded and prevented.

When the mirror herein is operated, the rocker member 30 is turned about the screw 49 in a contraclockwise direction, and the spring plate 46 is placed under tension as shown in Fig. 2. When the rocker member 50 is released the spring plate 46 causes the rocker member 50 to return to neutral position and not to go beyond that position, being prevented from going beyond that position by the lower foot 51 and the spring plate 46. When the mirror is reset, the stud 73 on the synchronizer lever 44 passes under the lip or flange 52 of the rocker member 50 causing said member to be turned in a clockwise direction about the screw 48 and against the tension of the said spring plate 46, as indicated in Fig. 5. When the said stud 73 clears the lip or flange 52 of the rocker member 50, the stud 73 releases the rocker member 50, which is caused to be turned in a contraclockwise direction by the spring plate 46 until the neutral position is again reached, as in Fig. 3, and the said rocker member 50 is prevented from being turned further by the lower foot 51 and the spring plate 46. This action is what always occurs in the operation of the mechanism shown.

I have in Figs. 10 to 13 shown certain general features of the camera including the focal plane shutter with its different exposure areas capacity and including means to release the focal plane shutter curtains from closed position.

Referring to said figures, Fig. 10 is a horizontal section through a roll film reflex camera such as shown in Fig. 14 of the said patent to Petit and Hineline 1,980,456. Therefrom has been omitted the lens mounting structure. The mirror is normally spring pressed outward (that is, toward a horizontal or picture-taking position), but as it swings outward the edge of its frame is engaged by an end of the plate 50 hinged at 51 in the casing and is there provided with a coil spring 52 tending to throw the said plate upward.

In said Fig. 10 the outer curtain roller is indicated at 91, the outer curtain roller shaft at 92, the outer curtain at 93 and the inner curtain roller at 94. The inner curtain roller shaft is indicated at 95 and the inner curtain itself at 96. Mounted upon shafts 92 and 95, and also attached to the curtain rollers 91 and 94, are the usual tension springs 97. Shutter curtain idler rollers are indicated at 98, 99, the inner curtain rewind roller at 100 and the outer curtain rewind roller at 101. The spool carrying the unexposed film roll is shown at 108 and the film roll itself at 109, it being, in the loading or film positioning operation, passed about a series of guide rollers 110, 111, 112, 113, 114, and thence to the take-up spool 114 at the opposite end of the camera casing. In suitable relation to the film 109, so as to permit the passing thereof to be observed, is a small red window 115, shown in Fig. 10.

Referring to Fig. 11, the outer shutter curtain 93 is provided with extending ribbons 102, 102 and the said inner curtain 96 is provided with similar extending ribbons (not shown) which are back of the ribbons 102, 102 and are attached to the curtain rewind roller 100. The outer curtain 93 is provided with the usual strut or stiffener 103, as is also the inner curtain 96. The tension roller 91 is provided with a shaft 104 and the tension roller 94 is provided with a shaft 105. The rewind roller 100 is provided with a shaft 106 therethrough, and on its upper end it has attached thereto a pinion 107' meshing with a rewind gear 108'. The outer curtain rewind roller 101 is provided with a shaft 109' and a pinion 110' meshing with a rewind gear 111', attached to which is a rewind knob 112'. Contained within the rewind knob 112' is a suitable mechanism for changing the relationship of gear 111' with respect to the immediately co-acting gears so as to cause a change in the position of the pinions 107' and 109' and the outer curtain 93 and inner curtain 96, thus causing a change in aperture between the strut 103 of the outer curtain 93 and the strut 103 of the inner curtain 96. The rewind gear 108' is provided with a pin 113' that is engaged by a pawl 114' of a lever 115' when the shutter curtain structure is in a wound-up condition. The said lever 115' is provided with a shutter release lever finger 116 positioned in the path of the mirror resetting lever 117. The said mirror reset lever 117 is pivoted to the camera side wall 25, shown in Figs. 1, 2, 6 and 7 on a shoulder rivet 118, and is connected to the mirror 28 by a link 119, one end whereof is attached to the arm 120 of the lever 117 by a rivet 121. The upper end of the said link 119 is attached to the stud 38, shown in Figs. 1, 2, 3, 5 and 6 as attached to the mirror 28, which is pivotally mounted on the pin 29, as already stated. When the mirror 28 is released by the movement of the mirror release lever 30, previously described, the said mirror 28 is caused to be swung in an upward direction, taking with it the link 119 and the arm 120 of the lever 117, causing said lever 117 to be moved in a clockwise direction, thus contacting with and moving in a right hand direction the said shutter release lever finger 116, thereby disengaging the pawl 114' from the pin 113' and allowing the focal plane shutter curtain to run down. The operation of such shutter curtain is more fully set forth in the said patent to Petit and Hineline 1,980,546.

I believe that the construction herein disclosed by me is the first to constitute a synchronizer for miniature reflecting cameras that will function at the several shutter speeds with capacity for adjusting the time delay to accommodate any flash lamp on the market at the time my original application above referred to was filed, and is the first to constitute a synchronizer actuated by mirror movement wherein the electric circuit is automatically opened after being completed—that is, before or by the time the shutter reaches picture-taking position.

Having thus described one illustrative embodiment of the invention, it is to be understood that although specific terms are employed, they are used in a generic and descriptive sense and not for purposes of limitation, the scope of the invention being set forth in the following claims.

I claim:

1. In means for accurately synchronizing the operation of a focal-plane shutter with the flashing of a photo-flash lamp; a miniature camera of the reflex type having a containing casing adapted to be opened and entirely closed, having a focal-plane shutter with different-exposure-areas capacity, having a pivoted mirror movable from focusing to picture-taking position, and having means to release the said shutter from closed position by such movement of the mirror; electrically controlled photoflash means including a photoflash lamp and circuit; contacts within said casing adapted to be closed to flash said lamp; and means entirely within said casing and controlled by mirror movement from focusing position toward picture-taking position to close said contacts at a time to cause said flash to begin before the shutter begins to open; said last mentioned means entirely within the camera casing including a synchronizer mechanism plate 40 adjustably supported within said casing, and on which the contacts are mounted, a synchronizer lever adjacent said plate within said casing and pivoted substantially in advance of the pivotal axis of the mirror, and having an interengaging connection with the mirror frame to be moved thereby upon its pivot for moving said contacts into circuit closing position, said synchronizer lever having an angular motion-multiplying arm to engage and move the support for one of said contacts to effect contact closing, a shaft 66 supported within the casing and having an adjusting connection with said plate, said shaft extending through a wall of the casing for exterior manual manipulation, said mechanism plate being movable by said shaft to vary the time of closing said contacts that is effected through the said movement of said synchronizer lever.

2. In means for accurately synchronizing through mirror movement the operation of a focal plane shutter with the flashing of a photoflash lamp; a miniature camera of the reflex type having a casing containing the photographically functioning parts and adapted to be opened and to be entirely closed, said casing having within the same at least one inner wall extending transversely to the pivoted axis of the mirror; said camera having a focal plane shutter with different exposure-areas capacity, and having a mirror frame with mirror pivotally mounted at one side of said inner wall upon an axis normal to said inner wall, so as to be movable from inclined focusing position to horizontal picture-taking position, said mirror frame having a laterally extending projection through said inner wall; said camera having means to release the said shutter from closed position by such movement of the mirror toward picture-taking position; electrically-controlled photoflash means including an electric circuit having therein a photoflash lamp and having contact points within said casing; a synchronizer mechanism plate pivotally mounted near its upper end within the casing on said inner wall at the side thereof opposite said mirror and at a point close to but in advance of the said pivotal axis of said mirror; one of said contact points in said circuit being stationarily mounted on said synchronizer mechanism plate; a synchronizer lever pivoted upon said synchronizer mechanism plate at a point substantially in advance of the plane of the mirror when in focusing position and of the pivotal axis of said mirror and having a short arm extending from its pivot and engaging said lateral projection on the mirror frame extending through said inner wall, so as to be moved by mirror movement to close said contacts during the first half of the mirror movement toward picture-taking position; a rocker member pivotally mounted upon said mechanism plate and carrying the other of said contact points of said electric circuit within said casing; said synchronizer lever having an angular motion-multiplying longer arm and said rocker member having a formation for interengagement and so positioned relative to each other that in the first half of the movement of the mirror from focusing position toward picture-taking position the said rocker member is moved by said synchronizer lever to cause the closing of said contact points and the flashing of the flash lamp to begin before the shutter begins to open, and so that during the further movement of said mirror toward picture-taking position the opening of said contact points prior to the arrival of the mirror at picture-taking position may be effected; spring means carried by said mechanism plate in constant engagement with said rocker member to compel, upon such disengagement of said formations, the return of said rocker member to neutral position, so that said contact points are opened prior to the said arrival of said mirror at picture-taking position and remain open while said neutral position is maintained, and means extending from said mechanism plate to the outside of the camera for turning said plate upon its pivot to effect synchronizing adjustment.

3. Reflex camera synchronization comprising a miniature, reflex, high-speed camera having a focal plane shutter with different exposure-areas capacity and having a mirror movable through forty-five degrees of movement from focusing to picture-taking position, and having means to release said shutter from a closed position by such movement of the mirror; electrically controlled photoflash means including a photoflash lamp and circuit; contacts within the casing of the camera adapted to be closed to flash said lamp; means connected to said mirror and thereby controlled by mirror movement from focusing position toward picture-taking position, so as to close said contacts during the said movement of said mirror to picture-taking position and thereby cause the flash of the lamp to begin before the shutter begins to open, for the purpose of producing the peak of the flash coincidentally with the presentation of an exposure area by said shutter, and to open said contacts not later than the time the mirror reaches the limit of its said travel to picture-taking position; said last mentioned means including a synchronizer lever having an interengaging connection with the mirror frame to be moved thereby upon its pivot for moving said contacts into circuit closing position, said synchronizer lever having an angular motion-multiplying arm to engage and move the support for one of the said contacts to effect contact closing; and adjustable means for varying the timing of the said closing of the said contacts so as to effect said closing (according to the setting of said adjustable means) after ten degrees of such movement has occurred, up to ten degrees prior to the arrival of the mirror at its picture-taking position, thereby to allow, in effecting synchronization, for variable such as differences in shutter action due to changes in the spring tension of the shutter and the time delay in flash bulbs.

4. Reflex camera synchronization comprising a miniature, reflex, high-speed camera having a focal-plane shutter with different exposure-areas capacity and having a mirror movable from focusing to picture-taking position, and having means to release said shutter from a closed position by such movement of the mirror; electrically-controlled photoflash means including a photoflash lamp and circuit; contacts adapted to be closed to flash said lamp; means connected to the said mirror and thereby controlled by mirror movement from focusing position toward picture-taking position to close said contacts at a point substantially half way in the movement of the mirror from the focusing position to its picture-taking position and thereby cause the flash of the lamp to begin before the shutter begins to open, and to open said contacts not later than the time of arrival of the mirror at its picture-taking position; said last mentioned means including a synchronizer lever having an interengaging connection with the mirror frame to be moved thereby upon its pivot for moving said contacts into circuit closing position, said synchronizer lever having an angular motion-multiplying arm to engage and move the support for one of the said contacts to effect contact closing; and adjusting means to vary by advancement or by retardation the time of closing said contacts from said half way point to effect synchronization with the peak of the flash of said photoflash lamp, but without thereby preventing the said subsequent opening of the said contacts by the time the mirror reaches its picture-taking position and not affecting such opening of said contacts except for such advancement or such retardation thereof as is incidental to the said adjustment of the exact instant of the said closing of the said contacts, but assuring such opening of said contacts by the time the mirror reaches its picture-taking position.

5. In means for accurately synchronizing the operation of a focal-plane, roller-supported shutter with the flashing of a photoflash lamp; a camera of the reflex type having a containing casing adapted to be opened and entirely closed, having a focal-plane roller-supported shutter with different exposure-areas capacity, having a mirror pivotally mounted close to the upper wall of the casing for movement from focusing to picture-taking position, and having means to release said shutter, for making an exposure, by such movement of the mirror; electrically controlled photoflash means including a photoflash lamp and an electrical circuit having within said casing contacts to be closed to complete the circuit to said lamp; a movable member mounted in said casing at a point relatively remote from the pivot of said mirror and carrying one of said contacts, and extending to a point close to the lower edge of the mirror when the latter is in focusing position, so as there to be engaged for movement into contact-closing position; a synchronizer lever pivoted within said casing laterally beyond said mirror but at a point in front of the inclined plane of the mirror when the latter is in focusing position and near a horizontal plane passing transversely through the pivotal axis of the said mirror, said synchronizer lever having a short arm extending from its pivot into interengaging relation with the frame of said mirror, and having downwardly extending from its pivot a materially longer arm positioned in front of the said inclined plane of the mirror when the latter is in focusing position, and having a formation to engage said contact-carrying movable member by a swinging movement of said longer arm, which movement is opposite to the direction of upward swing of the said mirror and simultaneous therewith, the said longer lever arm providing, because of the interengagement of the said short arm with the mirror frame, a materially greater speed of angular movement, where it engages and moves said contact-carrying movable member, than is the upward speed of the simultaneously moving mirror toward its picture-taking position upon release, so that the said contacts are closed at such an early part of the mirror-movement time toward picture-taking position as to cause the flashing of the lamp to begin before the shutter begins to open, thereby producing the peak of the flash coincidentally with the presentation of an exposure area of the shutter, after its said release, at the exposure aperture of the camera.

6. A structure in accordance with claim 5, but wherein the camera casing is provided with at least one inner wall extending transversely to the pivotal axis of the mirror and laterally beyond said mirror, and wherein there is a mechanism plate 40 pivotally mounted upon said wall at the face therof opposite to said mirror, and upon which mechanism plate are mounted the fixed contact and the movable member on which the other of said contacts is directly carried, and also the said synchronizer lever, and wherein there is provided means connected to said mechanism plate and extending to the outside of the camera casing for manually adjusting the said mechanism plate upon its pivot to vary the time of contact closing.

7. A structure in accordance with claim 5, but wherein the camera casing is provided with at least one inner wall extending transversely to the pivotal axis of the mirror and laterally beyond said mirror, and wherein there is a mechanism plate 40 pivotally mounted upon said wall at the face thereof opposite to said mirror, and upon which mechanism plate are mounted the fixed contact and the movable member on which the other of said contacts is directly carried, and also the said synchronizer lever, and wherein there is provided means connected to said mechanism plate and extending to the outside of the camera casing for manually adjusting the said mechanism plate upon its pivot to vary the time of contact closing, and wherein said mechanism-plate adjusting means includes a pin 61 to engage said mechanism plate and also shaft means carrying said pin and extending through an outer wall of the camera casing and there provided with means accessible to the operator for turning said shaft and thereby accurately adjusting the position of said synchronizer mechanism plate.

8. A structure in accordance with claim 5, but wherein the movable member carrying one of said contacts is a rocker lever 50 mounted in the casing upon a pivot in advance of the plane of the mirror when in focusing position and near the lower edge of said mirror when in such position, and wherein spring means is provided to compel the return of said movable member to a neutral position in which the contacts are open, and thereby preventing so-called "contact bounce" as the shutter is rewound.

9. A structure in accordance with claim 5, but wherein the movable member carrying one of said contacts is a rocker lever 50 mounted in the casing upon a pivot in advance of the plane of the mirror when in focusing position and near the lower edge of said mirror when in such position, and wherein spring means is provided within said casing in constant engagement with said movable member to compel the return of said member to neutral position, so that the said contact points are opened prior to the arrival of the mirror at picture-taking position, and remain open while said neutral position is maintained, and wherein for this purpose the said movable member is provided with feet-like formations positioned for alternate engagement with said spring means in the rocking movement of said movable member in the closing and the opening of said contacts, and for joint engagement with said spring means to hold said movable member in neutral position with said contacts open.

10. A structure in accordance with claim 5, but wherein the camera casing is provided with at least one inner wall extending transversely to the pivotal axis of the mirror and laterally beyond said mirror, and wherein there is a mechanism plate 40 pivotally mounted upon said wall at the face thereof opposite to said mirror, and wherein the said wall is provided with an opening through which extends a formation upon the mirror frame and with which formation the short arm of the synchronizer lever has an interengaging relation to effect the swinging movement of said synchronizer lever by mirror movement.

11. A structure in accordance with claim 5, but wherein the camera is of the roll-film type.

12. In means for accurately synchronizing the operation of a focal-plane, roller-supported shutter with the flashing of a photoflash lamp; a camera of the reflex type having a containing casing adapted to be opened and entirely closed, having a focal-plane roller-supported shutter with different exposure-areas capacity, having a mirror pivotally mounted close to the upper wall of the casing for movement from focusing to picture-taking position, and having means to release said shutter, for making an exposure, by such movement of the mirror; electrically controlled photoflash means including a photoflash lamp and an electrical circuit having within said casing contacts to be closed to complete the circuit to said lamp; a movable member mounted in said casing at a point relatively remote from the pivot of said mirror and carrying one of said contacts and extending to a point close to the lower edge of the mirror when the latter is in focusing position, so as there to be engaged for movement into contact-closing position, angular motion-multiplying means movably mounted within said casing in advance of the down position of the mirror and of its pivotal axis and moved by movement of the mirror toward picture-taking position and extending close to the said contact-carrying movable member, so as in its angular motion-multiplying movement to engage said contact-carrying movable member, and thereby to close said contacts at such an early part of the mirror movement toward picture-taking position as to cause the flashing of the lamp to begin before the shutter begins to open, thereby producing the peak of the flash coincidentally with the presentation of an exposure area of the shutter, after its said release, at the exposure aperture of the camera.

13. In means for accurately synchronizing the operation of a focal-plane roller-supported shutter with the flashing of a photoflash lamp; a camera of the reflex type having a containing casing adapted to be opened and entirely closed, having a focal-plane roller-supported shutter with different exposure areas capacity, having a mirror movable from focusing to picture-taking position, and having means to release the said shutter for making an exposure by such movement of the mirror; electrically controlled photoflash means including a photoflash lamp and an electrical circuit; contacts adapted to be closed to complete the circuit to said lamp and angular motion multiplying means controlled by mirror movement from focusing position toward picture-taking position to close said contacts at a time to cause a flash of the lamp to begin before the shutter begins to open, and to open said contacts by continued mirror movement in the same direction not later than the arrival of the mirror at its picture-taking position.

14. In means for accurately synchronizing the operation of a focal-plane roller-supported shutter with the flashing of a photoflash lamp; a camera of the reflex type having a containing casing adapted to be opened and entirely closed, having a focal-plane roller-supported shutter with different exposure areas capacity, having a mirror movable from focusing to picture-taking position, and having means to release the said shutter for making an exposure by such movement of the mirror; electrically controlled photoflash means including a photoflash lamp and an electrical circuit; contacts adapted to be closed to complete the circuit to said lamp and angular motion multiplying means controlled by mirror movement from focusing position toward picture-taking position to close said contacts at a time to cause a flash of the lamp to begin before the shutter begins to open, thereby producing the peak of the flash coincidentally with the presentation of an exposure area of the said shutter, after its said release, at the exposure aperture of the camera.

15. In means for accurately synchronizing the operation of a focal-plane roller-supported shutter with the flashing of a photoflash lamp; a camera of the reflex type having a containing casing adapted to be opened and entirely closed, having a focal-plane roller-supported shutter with different exposure areas capacity, having a mirror movable from focusing to picture-taking position, and having means to release the said shutter for making an exposure by such movement of the mirror; electrically controlled photoflash means including a photoflash lamp and an electrical circuit; contacts adapted to be closed to complete the circuit to said lamp, a movable member carrying one of said contacts, angular motion-multiplying synchronizer means pivotally mounted, distinct from, and substantially in advance of, the pivotal axis of the mirror, said pivotally mounted synchronizer means having one short functioning arm engaging and moved by the mirror frame to cause said contacts to be closed and then opened by the continued movement of the mirror in the same direction, said pivotally mounted synchronizer means having another and materially longer functioning arm to engage and move said movable contact-carrying member, thereby to effect such closing and such subsequent opening of said contacts, by such angular motion-multiplying movement, the said specified construction of the co-acting parts causing the said closing of said contacts at a time to cause the flashing of the lamp to begin before the shutter begins to open, thereby producing the peak of the flash coincidentally with the presentation of an exposure area of the said shutter, after its said release, at the exposure aperture of the camera, and to open said contacts by continued mirror movement in the same direction not later than the arrival of the mirror at its picture-taking position.

16. A miniature camera having a containing casing to be opened and entirely closed, having a focal plane shutter, having a mirror pivoted close to the upper wall of the casing for swinging upward movement from focusing to picture-taking position, and having means to release the shutter by mirror movement; electrically controlled photoflash means including a photoflash lamp and an electrical circuit having within said casing two contacts to be closed to complete the circuit to said lamp; a pivotally mounted member carrying the upper one of said contacts and when the camera is held in picture-taking position extending horizontally from its pivot from near the front wall of the casing toward the mirror and close to the level of the lower edge thereof when in its focusing position, so as there to be engaged for movement downward into contact-closing position; a synchronizer lever pivoted within said casing laterally beyond the mirror but at a point in front of the inclined plane of the mirror when the latter is in focusing position and near a horizontal plane passing transversely through the pivotal axis of said mirror, said synchronizer lever having a short arm extending from its pivot into interengaging relation with the frame of the mirror substantially below the pivotal axis of said mirror, and having a long downwardly extending arm positioned in front of the inclined plane of the mirror when the latter is in focusing position, and having a formation to engage said upper contact-carrying pivoted member by a rearward swinging movement of said longer arm, which movement is opposite in direction to that of the upward swinging of the mirror and simultaneous therewith, said longer lever arm thereby providing materially greater speed of angular movement when engaging said pivoted member than is the upward speed of the simultaneously moving mirror, whereby the said contacts are closed at such early part of the mirror's upward swinging movement toward picture-taking position as to cause the flashing of the lamp to begin before the shutter begins to open, and producing the peak of the flash coincidentally with the presentation of an exposure area of the shutter at the exposure aperture of the camera.

17. A miniature camera in accordance with claim 16, but wherein said camera is provided with an inner wall extending from the rear wall to the front wall of said casing laterally beyond the said mirror, and wherein said synchronizer lever is pivotally mounted upon said inner wall at the face of said inner wall that is the more remote from said mirror and through an opening in which inner wall the said interengagement is effected between the short arm of the synchronizer lever and the mirror frame.

18. A miniature camera in accordance with claim 16, but wherein said pivotally mounted member is provided with spring means to open said contacts and preventing contact bounce, and wherein the specified relative positions of the pivots of the said moving parts and the specified relative lengths of said moving parts effect the disengagement of the said longer arm of the synchronizer lever from said contact-carrying pivoted member and the opening of the contacts while the said longer arm of the synchronizer lever is still moving in the same direction as when the contacts were caused to be closed and while the mirror is still swinging upward toward picture-taking position.

LOUIS D. NADEL.